(12) United States Patent
Favaloro

(10) Patent No.: US 12,491,700 B2
(45) Date of Patent: Dec. 9, 2025

(54) SHIELDED MULTI-LAYER ABLATIVE/INSULATIVE MATERIAL FOR HYPERSONIC FLIGHT AND SIMILAR APPLICATIONS

(71) Applicant: Textron Systems Corporation, Hunt Valley, MD (US)

(72) Inventor: Michael Robert Favaloro, Amesbury, MA (US)

(73) Assignee: Textron Systems Corporation, Hunt Valley, MD (US)

( * ) Notice: Subject to any disclaimer, the term of this patent is extended or adjusted under 35 U.S.C. 154(b) by 312 days.

(21) Appl. No.: 18/120,498

(22) Filed: Mar. 13, 2023

(65) Prior Publication Data

US 2023/0286641 A1  Sep. 14, 2023

Related U.S. Application Data

(60) Provisional application No. 63/335,828, filed on Apr. 28, 2022, provisional application No. 63/318,860, filed on Mar. 11, 2022.

(51) Int. Cl.
  *B32B 7/027* (2019.01)
  *B32B 5/06* (2006.01)
  (Continued)

(52) U.S. Cl.
  CPC .............. *B32B 7/027* (2019.01); *B32B 5/073* (2021.05); *B32B 9/005* (2013.01); *B32B 9/047* (2013.01); *B32B 27/12* (2013.01); *B32B 27/205* (2013.01); *B64C 1/40* (2013.01); *B32B 2250/03* (2013.01); *B32B 2262/105* (2013.01);
  (Continued)

(58) Field of Classification Search
  None
  See application file for complete search history.

(56) References Cited

U.S. PATENT DOCUMENTS 3,419,495 A * 12/1968 Weldes .................. C04B 28/24
                                                           516/85
4,442,165 A *  4/1984 Gebhardt ............. C04B 35/532
                                                           428/408
(Continued)

FOREIGN PATENT DOCUMENTS

CN       107434421 B    12/2019
EP         1470912 A1   10/2004

*Primary Examiner* — Chinessa T. Golden
(74) *Attorney, Agent, or Firm* — BainwoodHuang

(57) ABSTRACT

A shielded, multi-layer heatshield material for hypersonic flight applications includes an ablative/insulative structure having a thickness and providing both thermal insulation and a first ablation resistance, and a separate shield layer bound to an outer surface of the ablative/insulative structure, the shield layer being thinner than the ablative/insulative structure while providing a second higher ablation resistance greater than the first ablation resistance. In one arrangement the ablative/insulative structure includes a carbon/carbon composite layer attached to a syntactic carbon foam layer, using carbon fiber stitched loops for reinforcement, and the shield layer is a carbide outer layer. In another arrangement the ablative/insulative structure includes a silica composite layer attached to a silica insulative foam layer, using stitched loops for reinforcement, and the shield layer is a ceramic outer layer.

10 Claims, 1 Drawing Sheet

(51) Int. Cl.
 *B32B 9/00* (2006.01)
 *B32B 9/04* (2006.01)
 *B32B 27/12* (2006.01)
 *B32B 27/20* (2006.01)
 *B64C 1/40* (2006.01)

(52) U.S. Cl.
 CPC . *B32B 2262/106* (2013.01); *B32B 2264/1021* (2020.08); *B32B 2264/108* (2013.01); *B32B 2307/304* (2013.01); *B32B 2307/306* (2013.01); *B32B 2605/18* (2013.01)

(56) References Cited

U.S. PATENT DOCUMENTS

| | | |
|---|---|---|
| 5,515,054 A | 5/1996 | Radford et al. |
| 5,985,405 A * | 11/1999 | Doucette, Jr. ............ F42B 15/34 |
| | | 428/92 |
| 6,273,362 B1 | 8/2001 | Fisch et al. |
| 6,935,594 B1 * | 8/2005 | Vaidyanathan ......... F42B 10/46 |
| | | 428/113 |
| 7,118,802 B2 | 10/2006 | Simon et al. |
| 7,681,834 B2 | 3/2010 | Facciano et al. |
| 8,830,139 B2 | 9/2014 | Chang |
| 9,012,823 B2 | 4/2015 | Sunne et al. |
| 9,912,048 B2 | 3/2018 | Waldrop, III et al. |

* cited by examiner

SHIELDED MULTI-LAYER ABLATIVE/INSULATIVE MATERIAL FOR HYPERSONIC FLIGHT AND SIMILAR APPLICATIONS

BACKGROUND

The invention is related to the field of heat shield materials, especially for use in hypersonic flight and similar applications.

SUMMARY

A shielded, multi-layer heatshield material for hypersonic flight applications is disclosed. It includes an ablative/insulative structure having a thickness and providing both thermal insulation and a first ablation resistance, and a shield layer bound to an outer surface of the ablative/insulative structure. In one embodiment, the shield layer is a carbide material, while in another embodiment, it is a ceramic material. The shield layer is thinner than the ablative/insulative structure while providing a second higher ablation resistance greater than the first ablation resistance. In one embodiment the ablative/insulative structure includes a high density fabric-based ablative layer and a low density microballoon-filled resin-based insulative layer (e.g., a syntactic foam) bound to an inner surface of the ablative layer. The material may employ stitching with reinforcing loops that strengthen the attachment of either/both the insulative layer and/or the shield layer to the fabric-based ablative layer.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Figure 1:
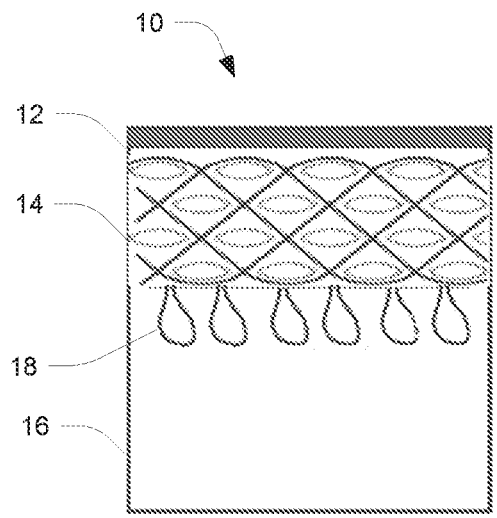
FIG. 1 is a cross-section view of an example shielded, multi-layer heatshield material according to a first embodiment.

A heatshield for a hypersonic vehicle must perform through thermal, physical, chemical, and mechanical changes associated with a high heat/ablation environment. The changes may include mass loss, chemical phases change, density change, thickness reduction, and the resultant deterioration of and/or change in structural properties associated with these conditions. The heatshield must retain some structural load carrying and thermal insulative capabilities to protect components internal to the vehicle. In contrast to a classic reentry vehicle, where the thermal load environment is relatively short in duration, a hypersonic vehicle's thermal load could be up to a factor of twenty times longer. Consequently, hypersonic heatshield materials must meet different requirements such as reduced ablation and improved thermal insulation.

A multilayer, multifunctional heatshield system for reentry applications is known, for example from U.S. Pat. No. 5,985,405 ('405 patent). This material may not be adequate for an extended glide hypersonic application. In one embodiment the heatshield combines a high density carbon/carbon composite outer layer with a low density carbon-based insulative foam inner layer. The outer layer is tuned to manage the combination of structural and ablative performance required for a comparatively short reentry trajectory, and the inner layer provides the necessary insulative requirements. Thicknesses of the two separate layers are determined by a combination of functional requirements, which include the thermal properties of the distinct materials and the ablation (outer layer) and insulative (inner layer) requirements of each layer, and the mechanical requirements for each layer. The layers are combined with a 'stitched-loop' approach, which provides a mechanical interface between the two through the flight. The stitched loop mechanical attachment eliminates interface separation from thermal expansion mismatch between the two materials.

The multifunctional system as described has been demonstrated through extensive ground and flight tests and has been determined to meet the needs of relevant strategic reentry systems. However, as flight times increase for hypersonic glide applications, carbon/carbon heatshields exhibit performance limitations due to excessive ablation attributed to the lengthy flight time under thermal load. Carbon fiber-based heatshields have historically been used for strategic missile reentry vehicles because their excellent ablation performance, combined with low relative density, as compared to other high temperature materials, allow for minimal thickness/mass loss within a given ablation environment. Longer thermal loads associated with hypersonic glide trajectories result in excessive ablation and oxidation of the heatshields. High levels of ablation can be addressed for a heatshield by simply increasing the thickness of the ablative layer. However, the thickness of the heatshield is limited by both the vehicle dimensional envelope and the acceptable mass. Consequently, excessive ablation causes a serious issue for heatshield performance.

In an extended duration oxidative environment of a hypersonic glide vehicle, some higher density materials such a silicon carbide, hafnium carbide and others survive better than carbon. However, use of these higher density materials as a heatshield is difficult because of the increased weight and resultant increased fuel requirements. A hybridized system of a carbon/carbon composite combined with an oxidation-resistant carbide-type coating for reduction or elimination of surface mass loss, combined with being an oxygen barrier for the carbon sublayer, is a preferred approach to reduce weight demands on the vehicle. These candidates also have relatively high thermal conductivity and consequently are hard to insulate, which is necessary to protect the payload of the vehicle from high thermal load.

In one aspect, a proposed solution includes both a multifunctional heatshield and a high-temperature carbide 'cap' (shield layer) to meet the needs of the hypersonic environment. With this approach, a thin high temperature carbide coating such as silicon carbide is applied over the top surface of a carbon/carbon dual layer heatshield, as described more below. A very thin cap, with a relatively low impact on system weight, can be utilized to minimize and potentially eliminate ablation during flight, while significantly extending flight time at temperature of the carbon/carbon dual layer heatshield. Towards the end of the flight, as the cap may lose most or all of its thickness due to ablation, the dual layer carbon/carbon composite heatshield can perform effectively.

In one particular use, a disclosed material is used in an area of a hypersonic missile adjacent to an internal antenna for transmission/reception of radio-frequency (RF) signals. In this use the material is referred to as an "aperture", according to its function of permitting passage of RF signals while still providing mechanical/thermal protection to internals of the missile. Beyond the types of challenges and requirements described above, an aperture for a hypersonic missile must also be able to both transmit and receive RF signals for the duration of an extended hypersonic glide environment. The '405 patent mentioned above is specifically directed to a multilayer antenna window system for reentry applications, but this may not be adequate for an extended glide application (e.g., 30 minutes or longer). In this application, the functional requirements include the dielectric properties of the distinct materials and the frequency needed to achieve adequate signal reception, the thermal properties of the distinct materials and the ablation (outer layer) and insulative (inner layer) requirements of each layer, and the mechanical requirements for each layer.

With the increased flight/glide times of hypersonic glide applications, the use of silica-based apertures may exhibit performance limitations. Silica-based antenna windows have historically been used for strategic missile reentry apertures because their high surface melt temperatures and viscosities, and relatively low dielectric constant, as compared to other dielectric ceramics, allow for tuning at a reasonable thickness to provide both acceptable electrical and mechanical performance within a given ablation environment. Longer thermal soaks associated with hypersonic glide trajectories result in excessive ablation of the apertures, to the point where electrical tuning to achieve signal reception is no longer possible. While higher levels of ablation could be addressed for a heatshield by simply increasing the thickness of the ablative layer, this could come at the cost of reduced signal quality. The thickness of the aperture is typically designed to ½ the signal wavelength in the material as defined by its dielectric constant (e.g., about 0.5 to 20 cm for signals in the range of 1-40 GHz). The father away from multiples of ½ wave the aperture becomes, the more difficult it is to receive an acceptable signal. Consequently, excessive ablation causes a serious issue for aperture performance. Fortunately, the high working melt viscosity combined with the similar electrical properties of the molten vs solid silica, work in favor of uniform performance through the target environment.

While there are higher temperature performing materials that can meet ablation needs in extended glide environments, such as silicon nitride, their high dielectric constant as compared to silica results in a ½ wave thickness that is much thinner than that of silica. Thinner designs may be much harder to insulate and may not meet the highly accurate electrical tuning associated with silica systems. Additionally, thinner designs may not meet mechanical load requirements for the aperture.

Thus in one embodiment, a disclosed material combines the multifunctionality of the dual layer aperture with a high-temperature dielectric shield layer to meet the needs of the hypersonic environment. With this approach, a thin high-temperature dielectric ceramic shield is applied over the outer surface of the silica dual layer aperture. The shield is composed of a higher melt temperature dielectric ceramic, such as silicon nitride for example, and is tuned to approx. 1/10th wave thickness. A very thin dielectric shield, even with a higher dielectric constant than silica, can be designed to provide effective electrical performance, while significantly extending flight time at temperature by thermally and mechanically shielding the silica composite.

Reentry vehicle apertures are typically used before and after exposure to in-flight plasma. The dielectric shield is designed with a thickness that allows signal transmission prior to plasma exposure, and at other points in an extended flight trajectory where plasma is not an issue, possibly as the vehicle skips in and out of the atmosphere. Towards the end of the flight, as the shield may lose most or all of its thickness due to ablation, the dual layer silica composite aperture can perform effectively.

Description of Embodiments

FIG. 1 is a cross-section view of an example shielded, multi-layer heatshield material 10 for hypersonic flight applications. It includes an ablative/insulative structure covered by a shield (outer) layer 12. In this example the ablative/insulative structure includes both a high-density fabric-based ablative layer 14 and a low density resin-based insulative layer 16, which is bound to an inner surface of the fabric-based ablative layer 14. The shield layer 12 is made of a high-melt-temperature material, examples of which are given below. As shown, the multi-layer material may employ stitching with reinforcing loops 18, such as carbon fiber stitched loops, that strengthens the attachment of the insulative layer 16 to the fabric-based ablative layer 14.

In one embodiment, the shield layer 12 is a carbide shield layer 12 made of a high-melt-temperature carbide, such as silicon carbide or hafnium carbide. The ablative layer 14 is a carbon/carbon composite, and the low density resin-based insulative layer 16 is a syntactic carbon foam. While the ablative/insulative structure (combination of fabric-based carbon/carbon composite 14 and carbon insulative foam 16) has a certain degree of ablation tolerance, the carbide shield layer 12 provides much greater ablation resistance as may be required for hypersonic glide applications, and does so with a relatively small thickness and correspondingly lower weight. Thus, in use the carbide shield layer 12 may provide the primary shielding throughout much or all of an extended hypersonic glide phase, while the ablative/insulative structure provides protection (both ablation resistance and thermal insulation) in a relatively shorter, end phase of operation.

The ablative/insulative structure having the fabric-based carbon/carbon composite 14 and carbon insulative foam 16 may be made in the manner described in the above-mentioned '405 patent, which is incorporated by reference herein in its entirety.

Various alternatives in the structure are contemplated. Reinforcement may be absent or may be accomplished by tufting or other interface type rather than stitch loops. The fibrous interface material (whether loops or other) may be alumina or silicon nitride rather than carbon thread. The ablative/insulative structure may be realized using a single-layer preform rather than a two-layer construction as shown above. The insulative foam 16 may incorporate additional material, such as quartz fiber, for added strength or other desired properties.

Figure 2:
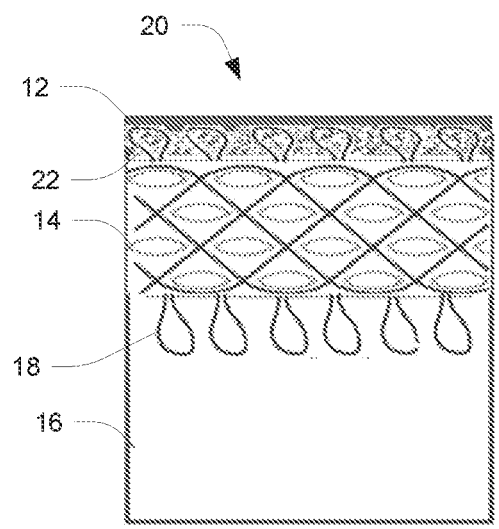
FIG. 2 is a cross-section view of an example shielded, multi-layer heatshield material according to a second embodiment.

FIG. 2 shows an alternative embodiment 20 in which separate reinforcing loops 22 are used to reinforce the attachment of the shield layer 12 to the underlying ablative/insulative structure. In this example, the loops 22 extend from the ablative layer 14 into the shield layer 12.

Returning to FIG. 1, in an alternative embodiment, the material 10 is a multi-layer dielectric material for hypersonic flight applications. The shield layer 12 may be a ceramic shield layer made of a high-melt-temperature dielectric ceramic, such as silicon nitride. When the material is used as an aperture, the shield layer 12 may be tuned to approx. 1/10th wave thickness (i.e., 1/10 of the wavelength of an RF signal (such as radar) used in operation). In this example the high-density fabric-based ablative layer 14 is a silica composite, and the low density resin-based insulative layer 16 is a silica insulative foam. Again, the multi-layer material may employ stitching with reinforcing loops 18 that strengthens the attachment of the (silicon foam) insulative layer 16 to the (silica) fabric-based ablative layer 14. In an alternative embodiment, similar reinforcing loops may also be used to reinforce the attachment of the (ceramic) shield layer 12 to the underlying ablative/insulative structure, such as described above with reference to FIG. 2.

While the silica-based ablative/insulative structure (combination of fabric-based silica composite 14 and silica insulative foam 16) has a certain degree of ablation tolerance, the ceramic shield layer 12 provides much greater ablation resistance as may be required for hypersonic glide applications and does so with a relatively small thickness (and corresponding acceptable signal performance) owing to its relatively high dielectric constant. Thus, in use the ceramic shield layer 12 may provide the primary shielding throughout much or all of an extended hypersonic glid phase, while the ablative/insulative structure provides protection (both ablation resistance and thermal insulation) in a relatively shorter, end phase of operation.

The ablative/insulative structure having the fabric-based silica composite 14 and silica insulative foam 16 may be made in the manner described in the above-mentioned '405 patent.

Various alternatives in the structure are contemplated. Reinforcement may be absent or may be accomplished by tufting or other interface type rather than stitch loops. The fibrous interface material (whether loops or other) may be alumina or silicon nitride rather than quartz. The ablative/insulative structure may be realized using a single-layer preform rather than a two-layer construction as shown above. The insulative foam 16 may incorporate additional material, such as quartz fiber, for added strength or other desired properties. In one embodiment an aperture may be formed by the multi-layer material as disclosed herein, being disposed at an opening of a missile body adjacent to an antenna as mentioned above, and secured to the surrounding missile body in some fashion. In another embodiment the aperture may incorporate a surround made of a conductive carbon or similar material functioning as a waveguide. The material may also incorporate additional material and structure to provide frequency selectivity, improving signal quality especially in the presence of jamming or other noise/interference.

It will be understood that a composite heatshield material such as the materials 10 or 20 are, in practice, adhered to an underlying substrate such as the metallic skin of a missile or other vehicle. In some embodiments, it may be beneficial to incorporate additional layers on the inside surface of the heatshield material (bottom most surface in FIGS. 1-2) either for enhanced strength (mechanical load tolerance) and/or improved attachment to the outer vehicle surface. In one example, a layer similar to the ablative layer 14 may be used as such an inside (bottom) layer, essentially creating a "sandwich" with the foam layer 16 sandwiched between two ablative layers. Reinforcement stitching may be used at both foam/laminate interfaces. In another embodiment, the sandwich arrangement could be extended to include two foam layers and three laminate layers, two on the outside and one separating the two foam layers. Alternative arrangements are of course possible.

While various embodiments of the invention have been particularly shown and described, it will be understood by those skilled in the art that various changes in form and details may be made therein without departing from the scope of the invention as defined by the appended claims.

What is claimed is:

1. A shielded, multi-layer heatshield material for hypersonic flight applications, comprising:
   an ablative/insulative structure having a thickness and providing both thermal insulation and a first ablation resistance; and
   a shield layer bound to an outer surface of the ablative/insulative structure, the shield layer being thinner than the ablative/insulative structure while providing a second higher ablation resistance greater than the first ablation resistance.

2. The heatshield material of claim 1, wherein the ablative/insulative structure includes a high-density fabric-based ablative layer and a low-density resin-based insulative layer bound to an inner surface of the fabric-based ablative layer.

3. The heatshield material of claim 2, wherein the fabric-based ablative layer is a carbon/carbon composite material, and the low density resin-based insulative layer is a syntactic carbon foam.

4. The heatshield material of claim 2, wherein the fabric-based ablative layer is a silica composite material, and the low density resin-based insulative layer is a silica insulative foam.

5. The heatshield material of claim 2, wherein the ablative/insulative structure employs stitching with reinforcing loops to strengthen attachment of the insulative layer to the fabric-based ablative layer.

6. The heatshield material of claim 5, wherein the reinforcing loops are first reinforcing loops, and further employing additional stitching with second reinforcing loops to strengthen attachment of the shield layer to the fabric-based ablative layer.

7. The heatshield material of claim 1, wherein the shield layer is a carbide shield layer.

8. The heatshield material of claim 7, wherein the carbide shield layer is made of a high-melt-temperature carbide selected from silicon carbide and hafnium carbide.

9. The heatshield material of claim 1, wherein the shield layer is a dielectric ceramic shield layer.

10. The heatshield material of claim 9, wherein the dielectric ceramic shield layer is made of silicon nitride.

* * * * *